Patented July 3, 1945

2,379,697

UNITED STATES PATENT OFFICE 2,379,697

PRODUCTION OF DIOLEFINS

Theodore W. Evans, Oakland, and Rupert C. Morris and Norten C. Melchior, Berkeley, Calif., assignors to Shell Development Company, San Francisco, Calif., a corporation of Delaware No Drawing. Application February 16, 1943, Serial No. 476,128

11 Claims. (Cl. 260—680)

This invention relates to the dehydrohalogenation of vinyl-type halides. It is of particular value in that it provides a practical and economical method for the production of butadiene from 2-chlorobutene-2.

Vinyl-type halides are unsaturated organic halides which are distinguished from non vinyl-type unsaturated halides in that they contain at least one halogen atom which is attached to an unsaturated carbon atom. Thus, any organic compound embracing any one or more of the structures or groupings,

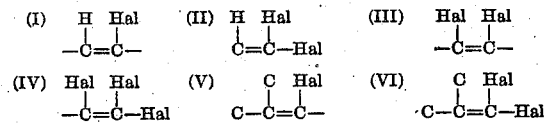

may be properly designated a vinyl-type halide or more simply a vinyl halide, while the term "vinyl halide atom" may be applied to a halogen atom present in such a grouping. The grouping may comprise part of an iso or normal alkyl chain which may or may not be attached to a cyclic radical as of the aromatic, alicyclic, and heterocyclic series or it may comprise part of an alicyclic structure.

Vinyl halide atoms are extremely difficult to remove or react and, as a consequence, the production of vinyl-type halides as by-products in chemical reactions is generally undesirable as creating a disposal problem. However, it is often impossible to avoid the formation of these refractory compounds. Thus, when dichlorbutane is dehydrochlorinated, for example, by means of a basic agent, the desired product being butadiene, substantial quantities of partially dehydrochlorinated material, including 2-chlorobutene-2, may be formed. Because of its refractory character further treatment of the 2-chlorobutene-2 with the basic agent to produce additional quantities of butadiene is without substantial effect.

It is therefore an object of the present invention to provide a method for the conversion of vinyl-type halides to unsaturated organic compounds such as poly-olefins, acetylenes, etc., which are better adapted for use in organic synthesis. Another and more specific object is to provide a process for the production of butadiene-1,3 and compounds isomeric therewith from 2-chlorobutene-2.

The process of the invention whereby the foregoing and other objects are accomplished is executed by contacting vapors of a vinyl-type halide with a compound catalyst comprising or consisting of a material having dehydrogenation-inducing characteristics impregnated on or otherwise combined with an "activated alumina", and recovering the desired unsaturated organic compound or compounds from the reaction mixture produced.

Although any vinyl halide may be subjected to the dehydrohalogenation treatment of the invention, it is preferred to treat vinyl halides wherein the halogen atoms are either chlorine, bromine or iodine.

The products resulting from the treatment of vinyl-type halides according to the invention are not those which would be expected from the use of a catalyst comprising a dehydrogenating substance. Thus, when 2-chlorobutene-2 is subjected to treatment, chloroprene is not formed in any detectable quantity, the reacted mixture predominating instead in dimethyl acetylene, butadiene-1,3 and methyl allene. In other words, the present invention is based on the discovery that the thermal treatment of vinyl-type halides in the presence of a substance having dehydrogenation-inducing properties results in the splitting off of hydrogen halide rather than in the splitting off of hydrogen alone when said substance is employed in association with an "activated alumina".

The dehydrogenation-inducing material which is incorporated upon the surface or within the pores of an "activated alumina", or which is otherwise combined with an "activated alumina" to yield the compound catalysts employed in the execution of the process of the invention, may be a metal, a mixture of metals, a metal compound, a mixture of metal compounds, or a mixture of one or more metals and one or more metal compounds. For example, suitable catalysts are those which comprise a metal or a compound of a metal of the group consisting of chromium, nickel, iron, cobalt, manganese, vanadium, titanium, scandium, copper, zinc, ytterbium, zirconium, columbium, molybdenum, masurium, ruthenium, platinum, rhodium, silver, cadmium, the rare earths, hafnium, tantalum, tungsten, osmium, irridium, gold, mercury, actinium, thorium, protoactinium and uranium. Some of these catalysts may be prepared by direct impregnation of the "activated alumina" with a solution of the metal compound which it is desired to incorporate on the surface thereof, while others can only be prepared indirectly, for example, by impregnation with one compound followed by a conversion treatment whereby said compound is converted to the desired compound. In any case, anyone skilled in the art can readily prepare a catalyst of any desired initial composition.

It will be noted that the above-listed metals are members of the transition series of the periodic table according to Bohr, and that the great majority of them are known to have variable valence. A preferred group of catalysts are those comprising an "activated alumina" and a metal and/or compound of a metal of the first transition series of the periodic table incorporated in the surface of the "activated alumina." The first transition series embraces the metals scandium, titanium, vanadium, chromium, manganese, iron, cobalt, nickel, copper and zinc. The metals molybdenum, cerium, tungsten and uranium are representative elements of the second, third, fourth and fifth transition series; these metals and their compounds have been found to be very suitable constituents of the catalysts employed in the execution of the process of the invention. Good results have been obtained by employing catalysts initially comprising an "activated alumina" and at least one oxide, sulphide, selenide, telluride, halide, phosphate, manganate, molybdate, chromate or bichromate incorporated in the surface of the "activated alumina." In general, excellent results can be obtained by employing catalysts consisting of an "activated alumina" and one or more oxides and/or sulphides of the above-listed metals incorporated in the surface of the "activated alumina."

A preferred subgroup of compound catalysts embraces those comprising an "activated alumina" and one or more chromium compounds. The chromium may be present in the compound catalyst in any chemical combination, either in a positive or negative state. For example, the chromium may be present in any one or a plurality of the compounds such as $Cr(OH)_3$, $CrO_3$, $Cr_2O_3$, $Cr_2S_3$, $Cr_3S_4$, $CrS$, $CrCl_3$, $Cr_2(SO_4)_3$, $Cr(NO_3)_3$, $Na_2CrO_4$, $K_2CrO_4$, $K_2Cr_2O_7$, $Na_2Cr_2O_7$, $FeOCr_2O_3$, $Al_2(CrO_4)_3$ and the like.

Another preferred subgroup of compound catalysts embraces those comprising an "activated alumina" and one or more iron oxides and/or sulphides. Excellent compound catalysts are those comprising an "activated alumina" and one or more iron oxides and/or iron sulphides and one or more chromium compounds. Representative compound catalysts of this mixed type are the compound catalysts of the composition $Fe_2O_3$-$Cr_2O_3$-"activated alumina,"

$Fe_3O_4$-$Na_2Cr_2O_7$-"activated alumina"

and the like.

The term "activated alumina" is used herein and in the appended claims to designate an aluminum oxide which is characterized by possessing the physical structure and surface characteristics of the "activated alumina" of commerce. It has been prepared and sold in this country since 1930, being recommended and used for the adsorption of gases and vapors from gaseous mixtures. "Activated alumina" has been so named because of its active adsorption properties for gases and vapors.

The compound catalysts may be prepared in a variety of suitable manners. A convenient method comprises impregnating the "activated alumina" in the form of granules or pellets of the desired size, with a solution, preferably an aqueous solution, of a compound of the metal which it is desired to combine with the "activated alumina," and then drying at the desired temperature. A convenient procedure comprises heating the "activated alumina" under a reduced pressure to a temperature of about 300° C. to remove air from the pores thereof, and cooling the material and adding the impregnating solution under reduced pressure. If desired, impregnation of the "activated alumina" may be accomplished by covering it with the impregnating solution and alternately boiling and cooling, or the mixture may simply be allowed to stand for a sufficient period of time. The concentration of the impregnating solution used in each particular case will depend upon the solubility of the particular metal compound at the temperature of the impregnation and upon the desired concentration of the active metal or metal compound in the compound catalyst. The procedure to be followed in drying or treating the impregnated material will vary depending upon the chemical constitution of the compound catalyst. In general, the material may be dried in air at temperatures as high as 800° C., and even higher in some cases. In other cases it may be desirable to effect the drying with inert gases such as nitrogen, or reducing gases such as hydrogen, paraffin hydrocarbons, etc.

Many of the metal compounds which are desired as catalytically active constituents of the compound catalysts, such as the oxides and sulphides, are not sufficiently water-soluble to permit direct impregnation of the "activated alumina" with aqueous solutions of them. In such cases, the "activated alumina" may be impregnated with an aqueous solution of a salt which can be converted to the desired metal oxide or metal sulphide by calcination or hydrogen sulphide treatment, respectively, of the impregnated material. The desired active metal oxide-containing catalysts may also be obtained by precipitating the corresponding metal hydroxide on the surface of the "activated alumina" and subjecting the thus obtained material to calcination under suitable temperature conditions. Other suitable modes of preparing the compound catalysts will be apparent to those skilled in the art. Conditions of preparation should be such that the essential physical structure and surface characteristics possessed by the "activated alumina" are not materially altered.

The invention is not restricted to the use of compound catalysts containing any specific amount of the active metal or active metal compound. The optimum concentration of the active material in the compound catalyst will generally depend upon the particular vinyl-type halide to be dehydrohalogenated and upon the conditions of temperature, space velocity, etc., under which the dehydrohalogenation is to be effected. It is preferable to employ compound catalysts wherein the carrier is in gravimetric excess of the active metal or metal compound. Good results have been obtained by employing compound catalysts containing from about 0.5% to about 40% by weight of the active metal or active metal compound. Higher or lower concentrations may be used when necessary or desirable. A preferred concentration range is from about 0.5% to about 10% by weight of the catalyst mass. In the case of the compound catalysts comprising a chromium compound as the active agent, good results were obtained with catalysts containing up to about 10% by weight of the catalyst mass.

Although the process of the invention may be carried out at atmospheric or higher pressures, it has been found that superior results are obtained by conducting the reaction at a pressure below 500 mm. In most cases an operating pressure of about 100–200 mm. is preferred. Operation at a reduced pressure of this order materially reduces the amount of polymerization, which is advantageous not only as providing for a higher yield of the desired product or products but also in that carbonization of the catalyst proceeds with much less rapidity.

It has been determined that polymerization and catalyst charring may also be reduced by diluting the feed mixture containing the vinyl halide under treatment with a suitable inert material, as hydrogen, nitrogen, carbon dioxide, and the like. This procedure, which serves to reduce the partial pressure of the vinyl halide within the reaction zone, is usually followed when it is desired to operate at atmospheric or a superatmospheric pressure.

It will, of course, be understood that neither of the above measures nor a combination thereof will completely prevent charring of the catalyst. The invention therefore contemplates the periodic treatment of the catalyst to restore its activity. The original activity of the catalyst can usually be restored by oxidizing the deposited carbon at elevated temperatures, for example, with elemental oxygen or a gas containing oxygen, as air, thereby effecting its removal.

The temperature at which the dehydrohalogenation is effected is below the temperature at which substantial molecular degradation of the vinyl halide occurs. This may vary with the molecular weight and atomic arrangement of the compound, the space velocity or reaction period, the activity of the particular catalyst, the effective concentration of the halide, the pressure under which the reaction is conducted, etc. A preferred temperature range is from about 300° C. to about 650° C. In general the desired products are not formed in any significant yield at temperatures substantially less than 300° C.

In the practice of the invention, should it be desired to recover the hydrogen halide in an anhydrous state, this may be accomplished by scrubbing the reaction mixture with a solvent having a preferential affinity therefor. Examples of solvents having a preferential affinity for hydrogen halides are the aliphatic simple and mixed ethers such as diethyl ether, methyl ethyl ether, di-isopropyl ether, dibutyl ether, dioxane, methyl dioxane, etc. Also, many alcohols, esters, aldehydes, ketones have a selective solvent power for hydrogen halides as contained in admixture with unsaturated organic compounds.

In some instances it may be found convenient to employ a selective solvent for the unsaturated organic products rather than for the hydrogen halide. Higher boiling hydrocarbons or hydrocarbon fractions as kerosene, the normal octanes, the iso-octanes, the octylenes, the nonanes, the nonylenes, the decanes and the like are examples of solvents which may be used to selectively extract unsaturated organic compounds from admixture with hydrogen halides.

Following the selective extraction or extractive distillation treatment with the selective solvent or solvents, the dissolved component or components may be recovered from the solvent by any suitable means as by distillation, reduction of pressure, etc.

When the process of the invention is carried out on a large scale and in a continuous manner it is preferred to recycle any unreacted material through the reaction zone. Also it should be mentioned that when operating with recycle it may be advantageous to effect a lower conversion per pass through the reactor (as through the use of a shorter contact time and/or lower temperatures, etc.) than when recycling is not employed. The material under treatment may be initially vaporized either in the reaction chamber itself or in a separate vaporizer having communication therewith.

The reaction chamber or tube of course should be constructed of material which will not catalyze the molecular degradation of the carbon structure of the halide under treatment. Reaction chambers fabricated from such material as quartz, brass, bronze, stainless steel, aluminum copper alloys such as "ambraloy," carbon and ceramic materials are, in general, quite satisfactory. If desired, a plurality of chambers may be employed, means being provided whereby the stream of feed material may be shifted from one to another. This is advantageous in connection with reactivation of the catalyst.

As previously stated herein, the process of the invention is especially valuable as a means of converting by-product 2-chlorobutene-2 to butadiene-1,3. In addition to butadiene-1,3 the splitting off of hydrogen chloride from 2-chlorobutene-2 according to the invention as stated yields ethyl acetylene, dimethyl acetylene (butadiene-1,2) and methyl allene. These compounds may find ready application as such or, if desired, they may be rearranged to butadiene-1,3, for example, by the process disclosed in co-pending application Serial No. 315,076, filed January 22, 1940, now U. S. Patent 2,325,398, issued July 27, 1943. In this latter event the apparatus in which the isomerization or rearrangement is effected may be contiguous with the apparatus in which the dehydrohalogenation is carried out.

The practice of the invention is illustrated by the following examples:

*Example I*

About 108 gms. of 2-chlorobutene-2 was passed over a catalyst consisting of chromium oxide on "activated alumina" (approximately 2–3% chromium) at a feed rate of approximately 4 cc. per minute. The volume of catalyst used was 40 cc. During the run a reduced pressure of 100 mm. was observed. The reaction temperature was about 475° C. Under the stated conditions nearly 80% of the chloride feed was reacted per pass through the reaction zone while the yield of $C_4$ hydrocarbons on the chloride reacted was about 84%. Nearly 64% of the consumed chloride was converted to butadiene-1,3 and isomers thereof.

*Example II*

Using a compound catalyst consisting of "activated alumina" and a small amount of iron oxide, other conditions being substantially the same as in the run of Example I, a yield of 84% $C_4$ hydrocarbons based on the chloride consumed was again obtained. Although the yield of butadiene-1,3 was somewhat less than in the above experiment, the total yield, i. e. of butadiene plus compounds as dimethyl acetylene, rearrangeable to butadiene-1,3, was greater, being about 73%.

We claim as our invention:

1. A process for dehydrochlorinating 2-chlorobutene-2 which comprises contacting 2-chlorobutene-2 with a compound catalyst comprising chromium oxide in association with "activated alumina" at a temperature of between about 450° C. and about 500° C., the pressure exerted by the 2-chlorobutene-2 within the contact zone being less than about 200 mm.

2. A process for dehydrochlorinating 2-chlorobutene-2 which comprises contacting 2-chlorobutene-2 with a compound catalyst comprising iron oxide in association with "activated alumina" at a temperature of between about 450° C. and about 500° C., the pressure exerted by the 2-chlorobutene-2 within the contact zone being less than about 200 mm.

3. A process for dehydrochlorinating 2-chlorobutene-2 which comprises contacting 2-chlorobutene-2 with a compound catalyst comprising a metal compound having dehydrogenation-inducing characteristics and "activated alumina" at a temperature of between about 450° C. and about 500° C., the pressure exerted by the 2-chlorobutene-2 within the contact zone being less than about 200 mm.

4. A process for dehydrochlorinating 2-chlorobutene-2 which comprises contacting 2-chlorobutene-2 with a compound catalyst comprising a material having dehydrogenation-inducing characteristics and "activated alumina" at a temperature of between about 300° C. and about 650° C., the pressure exerted by the 2-chlorobutene-2 within the contact zone being less than about 500 mm.

5. A process which comprises heating 2-chlorobutene-2 to a temperature of between about 300° C. and about 650° C. in the presence of a compound catalyst comprising a material having dehydrogenation-inducing characteristics and "activated alumina," and recovering butadiene-1,3 and compounds isomeric therewith from the reacted mixture produced.

6. The process of claim 5 wherein the pressure exerted by the 2-chlorobutene-2 within the reaction zone is not substantially greater than 500 mm.

7. A process for dehydrochlorinating 2-chlorobutene-2 which comprises contacting 2-chlorobutene-2 in vapor phase with a compound catalyst comprising a material having dehydrogenation-inducing characteristics and "activated alumina."

8. A process for dehydrohalogenating a 2-halobutene-2 which comprises contacting said 2-halobutene-2 at a temperature of between about 300° C. and about 650° C., with a compound catalyst comprising a material having dehydrogenation-inducing characteristics and "activated alumina," and recovering butadiene-1,3 and compounds isomeric therewith from the reaction mixture produced.

9. The process of claim 8 wherein the pressure exerted by the 2-halobutene-2 within the reaction zone is not substantially greater than 500 mm.

10. A process for dehydrohalogenating a 2-halobutene-2 which comprises contacting said 2-halobutene-2 in vapor phase with a compound catalyst comprising a material having dehydrogenation-inducing characteristics and "activated alumina."

11. The process of claim 10 wherein the pressure exerted by the 2-halobutene-2 within the reaction zone is not substantially greater than 500 mm.

THEODORE W. EVANS.
RUPERT C. MORRIS.
NORTEN C. MELCHIOR.